UNITED STATES PATENT OFFICE 2,191,498

MINERAL OIL COMPOSITION AND METHOD OF MAKING

Orland M. Reiff, Woodbury, N. J., assignor to Socony-Vacuum Oil Company, Incorporated, New York, N. Y., a corporation of New York No Drawing. Application November 27, 1935, Serial No. 51,969

11 Claims. (Cl. 87—9)

This invention relates primarily to an improvement in oils and particularly to the lowering of the temperature at which a hydrocarbon oil comprising a substantially homogenous mixture of liquid oils and waxy solids undergoes loss of fluidity. Ordinarily, this is referred to as the reduction of the pour point. Incidentally, the invention includes a new chemical composition suitable for use in this connection and the method of its manufacture.

In the petroleum industry much difficulty has been experienced because many otherwise satisfactory mineral oils cease to flow at temperatures far above their actual freezing points and thus are unfit for use where low temperatures are likely to be encountered. The reason for the peculiar behavior of these oils is that they contain waxes, or at least paraffinic bodies, which solidify in the form of a lattice-like structure at a considerably higher temperature than the freezing point of the oil. This lattice-like structure simply encloses the oil, even though the quantity of oil is greatly in excess of the quantity of wax, and the whole mass appears to become solid and ceases to be flowable.

The usual procedure adopted to prevent the occurrence of this undesirable phenomena consists in removing the offending wax. Such a method is expensive and troublesome, however, and in addition, the wax seems to contribute something to the lubricating quality of the oil, for without it, the lubrication is generally less satisfactory. Accordingly, attempts have been made, with considerable success, to prevent the formation of the lattice-like wax structure without removing the wax and it is to this end that the present invention is directed.

To inhibit the formation of the lattice-like structure without removing the wax, prior researches have shown that when small quantities of certain materials are added to the oil they will so affect the crystallization of the wax as to substantially diminish its tendency to enclose or entrain or occlude admixed oil. The present invention provides a new material for this purpose which material is highly effective even in very small quantities.

The known materials include certain products made by condensing chlorinated wax in the presence of aluminum chloride, either with or without naphthalene. Now, it has been discovered, that by proper manipulation, phenol can be condensed with chlorinated wax in the presence of aluminum chloride to form a far more effective pour point reducing agent. It should be understood, however, that the proper manipulation is a highly important factor, as the methods used for condensing naphthalene with chlorinated wax, when applied to the phenol-chlorinated wax condensation do not produce the highly desirable products that may be made according to the new method that forms a part of this invention.

According to Patent 1,815,022 granted to Garland H. B. Davis on July 14, 1931, naphthalene may be condensed with chlorinated wax by mixing the naphthalene with an equal weight of aluminum chloride and then slowly adding the chlorinated wax at a temperature of 140 to 160° F., and finally raising the temperature to around 200° F. to expel the hydrochloric acid formed. The aluminum chloride may then be settled out of the final product. If a phenol-chlorinated wax condensation product is made in this manner it is a relatively poor depressant and not very stable. On the other hand, if a phenol-chlorinated wax condensation product is made by the method hereinafter described, it is not only very highly effective, but it is also quite stable.

According to this invention it has been discovered that if the reaction between the phenol, chlorinated wax and aluminum chloride is carried out merely by heating the reactants slowly until the initial evolution of hydrochloric acid gas ceases, the aluminum of the aluminum chloride merely replaces the hydrogen on the OH group of the phenol and the chlorine, combining with this hydrogen forms hydrochloric acid. Thus the product so formed is mostly a mixture of an aluminum phenate type of compound perhaps containing some chlorine, unreacted phenol and chlorinated wax.

It has also been found, that if instead of terminating the reaction at the point where the first evolution of hydrochloric acid gas ceases, the temperature be further raised and an additional evolution of hydrochloric acid thus caused to take place, a wax substitution will take place but the aluminum will still remain as a part of the compound. For example, when using around 3% aluminum chloride, if the temperature is raised to about 350° F. to thus complete the reaction, the product at the end of the reaction and before further treatment contains a considerable amount of wax substituted aluminum phenate.

Further than the step of heating to complete the reaction, which is one important step in this invention, it has also been discovered that the wax substituted aluminum phenate type of compound can be converted into the desired wax substituted phenol and freed from aluminum both as a part of the compound and as intermixed aluminum chloride by hydrolyzing the product and washing out the reformed aluminum chloride, both with water containing butanol or the like.

Even though this outlined procedure is adopted, however, the type of product which is by far the most desirable will not result unless the conditions and proportions are appropriately regulated and the material formed is purified properly.

The conditions which are practically essential to the production and purification of the new product, if the best results are to be obtained, will be readily understood from the following detailed description of the new process. A skilled chemist will, of course, see numerous places where minor variations can be made, but any radical departure from the detailed instructions hereafter set forth is almost certain to result in a failure to produce the preferred type of product according to this invention.

In the first place, the reagents used are phenol, chlorinated wax and anhydrous aluminum chloride. The phenol, $C_6H_5OH$, should be substantially pure and free from water. The aluminum chloride is the usual commercial grade of anhydrous material.

The chlorinated paraffin wax, or chlorwax as it is sometimes called, is prepared from a paraffin wax melting at approximately 120° F. to 130° F. and having a molecular weight of the order of 300. Materials having short alkyl chains or low melting points are not capable of yielding the desired products and hence the use of petrolatum, wax distillate and the like is to be avoided. Although it is conceivable that such a wax might be derived from another source, it will usually be a petroleum wax. With the wax melted and heated to about 200° F., chlorine can be bubbled through until the desired amount, about 14%, is absorbed. Higher temperatures hasten this reaction, but if too high are likely to darken the product.

The degree of chlorination of the chlorwax is of considerable importance. As the chlorine content of the wax increases, the depressant effect of the product increases, but simultaneously, two detrimental characteristics develop. The product tends to become harder and less soluble in oil. This tendency becomes pronounced at about 18% of chlorine, and when chlorwax containing about 22% of chlorine is used, the resulting product is a rubbery mass practically insoluble in oil and very difficult to remove from the reaction vessel. On account of its lack of oil solubility, this product is practically useless for the purpose intended. At the same time, increases in chlorine content cause the wax substituted phenol formed from the chlorwax to be less stable at elevated temperatures. Below 12% of chlorine, the depressant ability of the product falls off to a marked degree. For these reasons it is preferred to use chlorwax containing about 14% of chlorine, or at least between 12% and 14%.

In accomplishing the reaction, phenol and chlorwax may be mixed together at a temperature varying from just above the melting point of the chlorwax to not over 150° F. The preferred proportions are one molecular amount of phenol to a sufficient proportion of chlorwax to contain four atomic proportions of chlorine. The admixed phenol and chlorwax are heated to about 150° F., and anhydrous aluminum chloride introduced. The amount of aluminum chloride used should be about 3% by weight of the chlorwax. While adding this reagent, the mixture should be actively stirred and the rate of addition should be sufficiently slow to avoid violent foaming. During the addition of the aluminum chloride, the temperature should be held at about 150° F. After the addition of the aluminum chloride has been completed, the temperature of the mixture may be raised slowly, over a period of around fifteen to twenty-five minutes, to about 250° F. and then more slowly to around 350° F. At about 200° F. a new evolution of hydrochloric acid begins and this continues as the temperature rises, becoming quite violent at around 275° F. To control the evolution of hydrogen chloride the temperature is preferably raised from 250° F. to 350° F. at a rate of approximately 1° F. per minute. The whole operation of heating to 350° F. will occupy approximately two hours from the time of adding the aluminum chloride, and the reaction mixture should have substantially ceased to emit hydrochloric acid gas when the final temperature is reached. If it has not done so, it may be held at 350° F. for a short time to allow completion of the reaction, but it should not be heated appreciably above 350° F., nor should it be held for any extended length of time at that temperature.

The ratio of one molecular proportion of phenol to sufficient chlorwax to contain four atomic proportions of chlorine is another important factor in producing the desired product. The effectiveness of the depressant products increase as the ratio of chlorwax to phenol increases until a ratio of three atomic proportions of chlorine to one molecular proportion of phenol is reached. The derivative having four atomic proportions of chlorine to one molecular proportion of phenol is slightly less effective but is more stable at elevated temperatures, however, and hence is preferred, particularly for use in internal combustion engines, such as automotive engines.

The percentage of aluminum chloride used is likewise not susceptible to wide variation if the most desirable products are to be obtained. When less than 3% of aluminum chloride is used (based on chlorwax) it is difficult to complete the reaction. Either prolonged heating at the above mentioned temperatures are necessary to obtain a desirable product or higher temperatures must be employed. The use of higher temperatures to accelerate the reaction results in cracking of the wax ingredient and greatly lessens the desirable characteristics of the product. With higher percentages of aluminum chloride, say of the order of 5%, a reaction may be accomplished at lower temperatures, but cracking also takes place, and so again the desired product does not result. In addition, the use of any greater quantity of aluminum chloride than is necessary is uneconomical and causes difficulty in purifying the final product. The effectiveness of the final material depends much upon the form of molecule of the wax ingredient, and any splitting, cracking, or shortening of this molecule immediately lessens the value of the product. Three per cent of aluminum chloride will secure proper reaction with a minimum of wax-splitting and is, for that reason, preferred.

The use of solvents of a hydrocarbon nature to expedite the above reaction, especially light solvents such as kerosene, or those containing unsaturated hydrocarbons, is to be avoided. A portion of such solvents may be substituted into the product, in place of the desired wax radical, and the presence of such short chain alkyls is highly detrimental. It is preferable to work entirely without solvents.

The manner of carrying out the reaction, especially with respect to temperature and relation of time and temperature, is of the utmost importance. To recapitulate, it is preferred to introduce aluminum chloride at about 150° F. and afterwards heat to a maximum of 350° F. over a period of about two hours, raising the temperature not more than a degree per minute between 250° F. and 350° F. Below about 150° F. only a mild reaction will result from the addition of 3% aluminum chloride to the phenol and chlorwax mixture. At 150° F. a more violent reaction occurs, but the evolution of hydrochloric acid soon ceases. If the resulting product is chemically examined it will be found that little or no alkyl substitution of the phenol has taken place. Instead a phenate type of compound seems to have been formed.

Upon raising the temperature, evolution of hydrochloric acid is resumed at about 200° F. and alkyl substitution appears to begin. Raising the temperature at the rate of one degree per minute brings about continuous evolution of hydrogen chloride and when the proportions are such that there are about four atomic weights of chlorine per molecular weight of phenol, this will cause substantial completion of the reaction by the time 350° F. is reached. Substantially lower rates of heating and/or exposure to temperatures greater than 350° F. tend to bring about conditions wherein the cracking effect of the aluminum chloride on the wax is sufficiently great to impair the effectiveness of the product as a depressant. Addition of aluminum chloride at temperatures higher than about 150° F. also result in decreased effectiveness, probably due to wax-splitting.

The product at this point is a good depressant, but under conditions of use does not remain so and rapidly loses its effect. Apparently the aluminum chloride is still combined in the product in some way, for it cannot be removed by settling or centrifuging, and the product is clear rather than opaque or even cloudy.

To properly purify the product, it must be treated with something that is capable of hydrolyzing out aluminum which then combines with chlorine, which remains dissolved in the mixture, to reform aluminum chloride. When washed with water the hydrolyzation apparently takes place, but difficultly separable emulsions are formed, and even when the washing is repeated a great number of times until the washings finally are neutral, the product is still not of the desired purity.

If instead, however, water containing an alcohol, such as butanol, is used and the product washed a half dozen times with equal volumes of water, each containing about 2% butanol, (based on product), the aluminum and chlorine are both removed. The washing should be accomplished with vigorous stirring and at relatively high temperatures, say of the order of 175° F. The first two or three washes, if desired, may be pure water without alcohol. The washing should be continued until the product is sufficiently free from aluminum, etc., to satisfy a requirement of 0.02% maximum ash content. Emulsion troubles in washing, and likewise instability of the final product, increase rapidly with increases in percentage of aluminum chloride used in its preparation.

The properties of the pour depressant product so prepared are substantially as follows:

Pour_____about__ 90° F.
Conradson carbon_____about__ 1.5%
Visc. Saybolt at 130° F____about__ 1930 seconds
Visc. Saybolt at 210° F____about__ 300 seconds
Ash—maximum_____about__ 0.02%
Mean molecular weight_____about__ 1000

The product described is now ready for incorporation in oil. Since it dissolves readily, all that need be done is to add the required amount to make the desired reduction in pour point. The following table indicates the effect of adding various amounts of the new depressant to a mineral lubricating oil of the type used in automobile engines. The particular oil used in obtaining the data given is a "Duo-sol" motor oil having a Saybolt viscosity of 249 seconds at 130° F. The depressant was made from chlorwax of 14% chlorine content using a proportion of chlorwax containing four atomic weights of chlorine per mole of phenol.

To show the comparative effectiveness of the new product similar data for a product made according to the Davis Patent No. 1,815,022, and for a product made by the process herein described, but using cresol instead of phenol is given.

| Concentration of depressant in oil, per cent | A. S. T. M. pour test | | |
|---|---|---|---|
| | Naphthalene product | Cresol product | Phenol product |
| | °F. | °F. | °F. |
| 0 | +20 | +20 | +20 |
| ⅛ | +10 | +20 | −10 |
| ¼ | 0 | +20 | −25 |
| ½ | −15 | +20 | |
| 1 | −20 | +20 | |
| 2 | | +15 | |
| 4 | | +20 | |

As indicative of the necessity for properly purifying the new material the following comparison was made between portions of the new material purified to different degrees. The ash content is given in each case as an indication of the purity and the data shows the pour point of an oil containing ½% of the new depressant after 2 and 3 days of a heat test. Two days of this heat test is about equivalent to a 2,000 mile road test in an automobile.

| Ash content, per cent | Pour point of oil during heat test | | |
|---|---|---|---|
| | Start | 2 days | 3 days |
| | °F. | °F. | °F. |
| .02 | −25 | −25 | 20 |
| .06 | −25 | | −15 |
| .1 | −25 | −20 | −10 |
| 1.2 | −25 | 0 | +10 |

I claim:
1. A mineral oil comprising a mixture of liquid oils and waxy hydrocarbons and having incorporated therein, a small proportion of wax-substituted phenol prepared from chlor-wax, unsubstituted phenol and anhydrous aluminum chloride by heating to around 350° F. and thereafter adding water to the mixture to effect removal of the aluminum chloride, the chlorwax containing around 14% of chlorine and the pro- portions of the ingredients being such that around four atoms of chlorine are originally present in the chlorwax for each molecule of phenol and there is also present about 3% of aluminum chloride based on the chlorwax, the pour point of the oil being depressed by said wax-substituted phenol.

2. A mineral oil comprising a mixture of liquid oils and waxy hydrocarbons and having incorporated therein, a small proportion of wax-substituted phenol prepared from chlorwax, unsubstituted phenol and anhydrous aluminum chloride by mixing at around 150° F. and heating to around 350° F. over a period of about two hours and thereafter adding water to the mixture to effect removal of the aluminum chloride, the chlorwax containing around 14% of chlorine and the proportions of the ingredients being such that around four atoms of chlorine are originally present in the chlorwax for each molecule of phenol and there is also present about 3% of aluminum chloride based on the chlorwax, the pour point of the oil being depressed by said wax-substituted phenol.

3. A mineral oil comprising a mixture of liquid oils and waxy hydrocarbons, and having incorporated therein, a small proportion of wax-substituted phenol prepared by mixing chlorwax and unsubstituted phenol, adding anhydrous aluminum chloride thereto at a temperature of around 150° F., heating the mixture to approximately 250° F., then raising the temperature at the rate of approximately 1° F. per minute to 350° F., discontinuing said heating and thereafter adding water to the mixture to effect removal of the aluminum chloride, the chlorwax containing about 14% of chlorin and the proportions of the ingredients being such that about four atoms of chlorin are originally present in the chlorwax for each molecule of phenol, aluminum chloride being used in the proportion of approximately 3%, based on chlorwax, the pour point of the oil being depressed by said wax-substituted phenol being capable.

4. A mineral oil comprising a mixture of liquid oils and waxy hydrocarbons and having incorporated therein a small proportion of a substantially pure wax substituted phenol otherwise unsubstituted formed by interacting chlorinated wax and phenol with heating in the presence of aluminum chloride at a temperature reaching about 350° F., sufficiently high to cause alkylation, and adding water thereto to effect removal of the aluminum chloride, the pour point of the oil being depressed by said wax substituted phenol.

5. A mineral oil composition comprising a mixture of liquid oils and waxy hydrocarbons and having incorporated therein a small proportion of a substantially pure wax-substituted phenol otherwise unsubstituted formed by interacting chlorinated wax and phenol with heating in the presence of aluminum chloride at a temperature sufficiently in excess of 200° F. to cause substantial alkylation, and adding water thereto to effect removal of the aluminum chloride, said wax-substituted phenol having an ash content of not more than around 0.02 per cent and the pour point of the oil being depressed by said wax-substituted phenol.

6. A mineral oil composition comprising a mixture of liquid oils and waxy hydrocarbons and having incorporated therein a small proportion of a substantially pure wax-substituted phenol otherwise unsubstituted formed by interacting chlorinated wax and phenol with heating in the presence of aluminum chloride at a temperature sufficiently in excess of 200° F. to cause substantial alkylation, and washing the reaction product with a mixture of alcohol and water to effect removal of the aluminum chloride, said wax-substituted phenol having an ash content of not more than around 0.02 per cent and the pour point of the oil being depressed by said wax-substituted phenol.

7. A mineral oil composition comprising a mixture of liquid oils and waxy hydrocarbons and having incorporated therein a small proportion of a substantially pure wax-substituted phenol otherwise unsubstituted formed by interacting chlorinated wax and phenol in proportions such that at least three atomic proportions of chlorine are present in the original materials for each mole of phenol with heating in the presence of aluminum chloride at a temperature sufficiently in excess of 200° F. to cause substantial alkylation, and adding water thereto to effect removal of the aluminum chloride, said wax-substituted phenol having an ash content of not more than around 0.02 per cent and the pour point of the oil being depressed by said wax-substituted phenol.

8. A mineral oil composition comprising a mixture of liquid oils and waxy hydrocarbons and having incorporated therein a small proportion of a substantially pure wax-substituted phenol otherwise unsubstituted formed by interacting chlorinated wax and phenol in proportions such that about four atomic proportions of chlorine are present in the original materials for each mole of phenol with heating in the presence of aluminum chloride at a temperature sufficiently high to cause substantial alkylation and adding water thereto to effect removal of the aluminum chloride, said wax-substituted phenol having an ash content of not more than around 0.02 per cent and the pour point of the oil being depressed by said wax-substituted phenol.

9. A mineral oil comprising a mixture of liquid oils and waxy hydrocarbons and having incorporated therein a small proportion of a substantially pure wax-substituted phenol otherwise unsubstituted formed by interacting chlorinated wax and phenol with heating in the presence of aluminum chloride at a temperature of from about 200° F. to about 350° F. sufficiently high to cause substantial alkylation as indicated by substantial cessation of hydrochloric acid evolution and adding water thereto to effect removal of aluminum chloride, the chlorwax containing from about twelve per cent to about fourteen per cent chlorine and the proportions of the ingredients being such that from about three to about four atoms of chlorine are originally present in the chlorwax for each molecule of phenol and there is also present from about three per cent to about five per cent of aluminum chloride based upon the chlorwax, said wax-substituted phenol being capable of depressing the pour point of the oil.

10. A mineral oil comprising a mixture of liquid oils and waxy hydrocarbons and having incorporated therein a small proportion of a substantially pure wax-substituted phenol otherwise unsubstituted formed by interacting chlorinated wax and phenol with heating in the presence of aluminum chloride at a temperature sufficiently high to cause substantial alkylation as evidenced by substantial cessation of hydrochloric acid evolution and adding water thereto to effect removal of aluminum chloride, the pour point of the oil being depressed by said wax-substituted phenol.

11. A mineral oil comprising a mixture of liquid oils and waxy hydrocarbons and having incorporated therein a small proportion of a substantially pure wax-substituted phenol otherwise unsubstituted formed by interacting chlorinated wax and phenol with heating in the presence of aluminum chloride at a temperature in excess of about 200° F. sufficiently high to cause substantial alkylation and adding water thereto to effect removal of aluminum chloride, the pour point of the oil being depressed by said wax-substituted phenol.

ORLAND M. REIFF.

CERTIFICATE OF CORRECTION.

Patent No. 2,191,498.                          February 27, 1940.

ORLAND M. REIFF.

It is hereby certified that error appears in the printed specification of the above numbered patent requiring correction as follows: Page 1, first column, line 4, for "homogenous" read --homogeneous--; page 3, second column, line 62, in the right-hand column of the table, for "20" read -- -20 --; page 4, first column, line 44, claim 3, strike out the words "being capable"; and that the said Letters Patent should be read with this correction therein that the same may conform to the record of the case in the Patent Office.

Signed and sealed this 9th day of July, A. D. 1940.

(Seal)                                                  Henry Van Arsdale,
                                                        Acting Commissioner of Patents.